United States Patent [19]
Bolt et al.

[11] Patent Number: 5,424,941
[45] Date of Patent: Jun. 13, 1995

[54] APPARATUS AND METHOD FOR POSITIONING A PNEUMATIC ACTUATOR

[75] Inventors: David J. Bolt, West Alexandria; Richard J. Bethke, Centerville; David J. Rediess, Dayton, all of Ohio

[73] Assignee: Mosier Industries, Inc., Brookville, Ohio

[21] Appl. No.: 739,999

[22] Filed: Aug. 2, 1991

[51] Int. Cl.⁶ .......................................... F15B 13/16
[52] U.S. Cl. .................................. 364/148; 91/361; 91/364; 91/459; 137/625.65
[58] Field of Search .......................... 364/148–152; 318/628; 91/275, 358 R, 361, 363 A, 364, 459; 137/625.64, 625.65

[56] References Cited

U.S. PATENT DOCUMENTS

| | | | |
|---|---|---|---|
| 4,106,390 | 8/1978 | Kodaira | 91/42 |
| 4,481,451 | 11/1984 | Kautz et al. | 318/628 |
| 4,628,499 | 12/1986 | Hammett | 364/167 |
| 4,666,374 | 5/1987 | Nelson | 417/3 |
| 4,741,247 | 5/1988 | Glomeau et al. | 91/361 |
| 4,763,560 | 8/1988 | Sasaki | 91/364 |
| 4,770,200 | 9/1988 | Nesler et al. | 137/84 |
| 4,790,233 | 12/1988 | Backe et al. | 91/361 |
| 4,819,543 | 4/1989 | Leinen | 91/363 R |
| 4,878,417 | 11/1989 | Facon | 91/363 R |
| 4,907,493 | 3/1990 | Bellanger et al. | 91/361 |
| 4,932,311 | 6/1990 | Mibu et al. | 91/361 |
| 5,154,207 | 10/1992 | Bolt | 137/625.25 |

OTHER PUBLICATIONS

Introduction To Robotic's Mechanics of Mechanical Systems & Control by John J. Craig.
An Analysis of A Penumatic Servo System And Its Application To A Computer-Controlled Robot by S. Liu.

*Primary Examiner*—Roy N. Envall, Jr.
*Assistant Examiner*—Thomas E. Brown
*Attorney, Agent, or Firm*—Biebel & French

[57] ABSTRACT

A closed loop control system for a pneumatic actuator using position and pressure feedback signals. The feedback signals are supplied to a microprocessor which successively generates a desired acceleration, a desired actuator force, a desired gas pressure, and a gas mass flow rate command for a gas flow controlling valve. The use of the gas flow rate as a control variable decouples pneumatic ronlinearities from the control loop. Nonlinear viscous friction, coulomb friction and load effects are decoupled from the control loop prior to the calculation of the desired pressure. An improved trajectory is achieved by employing a plurality of trajectory phases, including a velocity control phase.

12 Claims, 4 Drawing Sheets

APPARATUS AND METHOD FOR POSITIONING A PNEUMATIC ACTUATOR

BACKGROUND OF THE INVENTION

This invention relates to the field of pneumatic actuators and more particularly to automatic closed loop control of the position of a pneumatic actuator, Generally speaking, closed loop control of actuator positioning is a highly developed art. However, the prior art is concerned primarily with feedback control of linear systems. System non-linearities inherently associated with the compressibility of the working gas render the teachings of such prior art largely non-applicable to the automatic control of a pneumatic actuator.

The published work in the field of closed loop control of pneumatic actuators has nearly always attempted to achieve tight, stable positioning through the use of linearizing approximations. Typical assumptions have included: small actuator movement from a center position, chamber volumes which are constant and equal, small pressure differentials, and chamber pressures which are constant and equal. Such approximations are appropriate for certain specialized applications, but satisfactory control cannot be achieved when those and other linearizing approximations are applied to controllers for low pressure, long excursion actuators. In particular, linearizing assumptions have been found unsuitable for closed loop position control of pneumatic actuators employed in large industrial applications and having a piston travel distance in the order of about 200 in. and differential chamber pressures ranging from 0 to 100 psig. Thus while various closed loop schemes have been proposed, open loop positioning of such actuators has been the norm. Moreover, prior art controllers have generally generated trajectory commands for pneumatic actuators on a basis independent of the achieved responsive motion of the actuator. This has produced unsatisfactory performance characterized by dynamic stiffness, large positioning errors and performance variations along the stroke length.

SUMMARY OF THE INVENTION

This invention achieves closed loop positioning of a pneumatic actuator in a novel manner which decouples the system non-linearities and results in linear performance. In accordance with the practice of the invention a desired actuator position is computed and compared with a position feedback signal to develop a desired acceleration for the actuator. The desired acceleration is converted to a desired force which in turn is decoupled by adding terms relating to the expected load, coulomb friction and viscous friction. The desired force is then converted to a desired differential pressure across two faces of the actuator. A second decoupling operation is then performed by adding to the desired differential pressure, adjustment terms reflecting the combined effects of position, velocity, pressure and pressure change rate. This effectively converts the desired differential pressure into a desired differential mass flow rate to the cylinder chamber. Then the desired differential mass flow rate is put through a valve inverse operation to generate a drive current for the valve adjusting solenoid. A differential pressure feedback signal is compared with the desired differential pressure, and the actuator positioning is accomplished by linearized closed loop control of differential pressure. All significant non-linear effects are removed by the controller without making any of the prior art linearizing approximations.

This invention also contemplates improved closed loop control of a pneumatic actuator through a combination of position feedback, pressure feedback and a trajectory command method having a plurality of phases, during some of which command variables are dependent upon the actual motion of the actuator.

Other objects and advantages of the invention will be apparent from the following description, the accompanying drawings and the appended claims.

DESCRIPTION OF THE PREFERRED EMBODIMENT

Figure 1A:
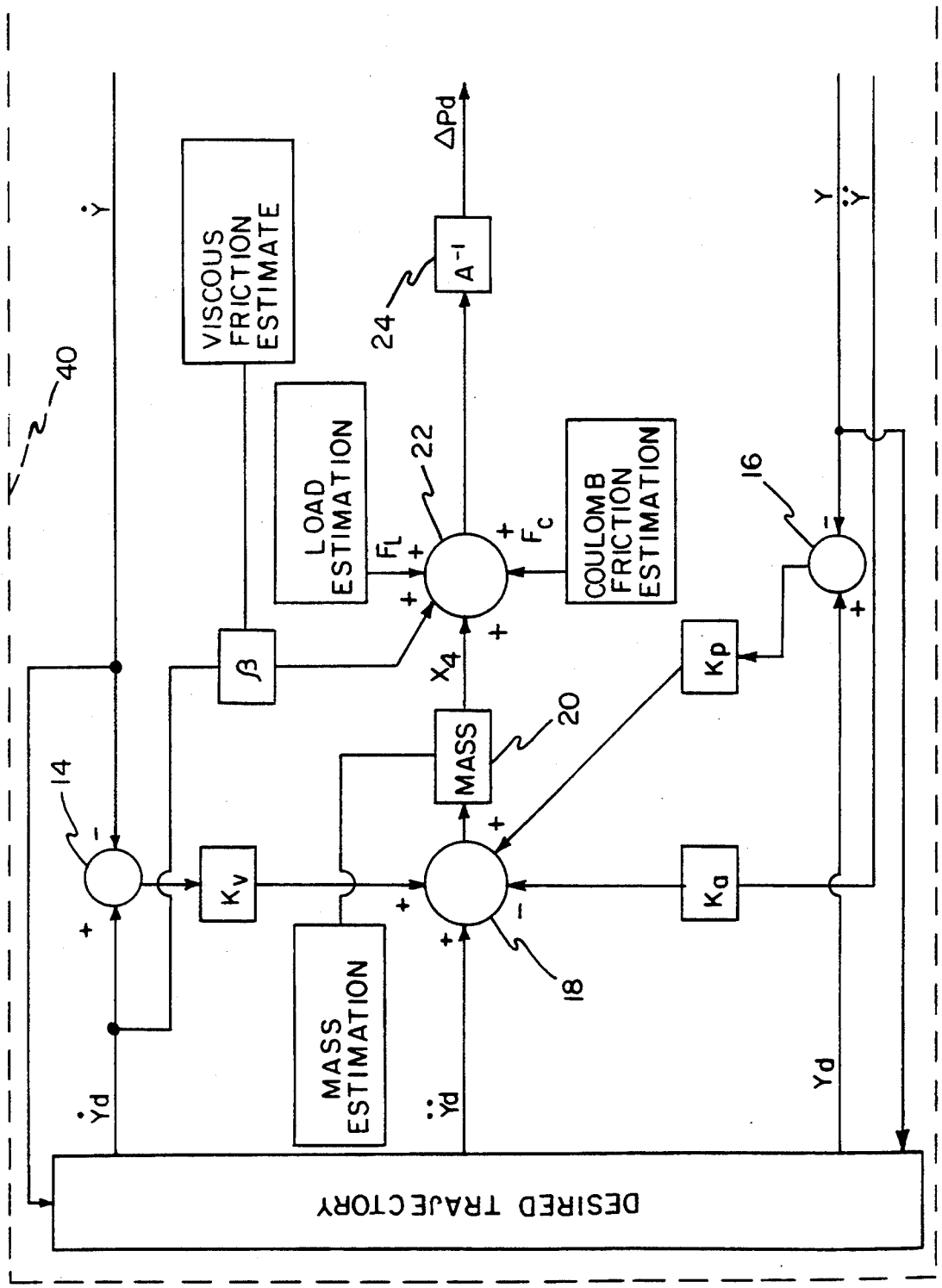
FIGS. 1A–1C are a schematic illustration of an actuator control system using position and pressure feedback.
Figure 1B:
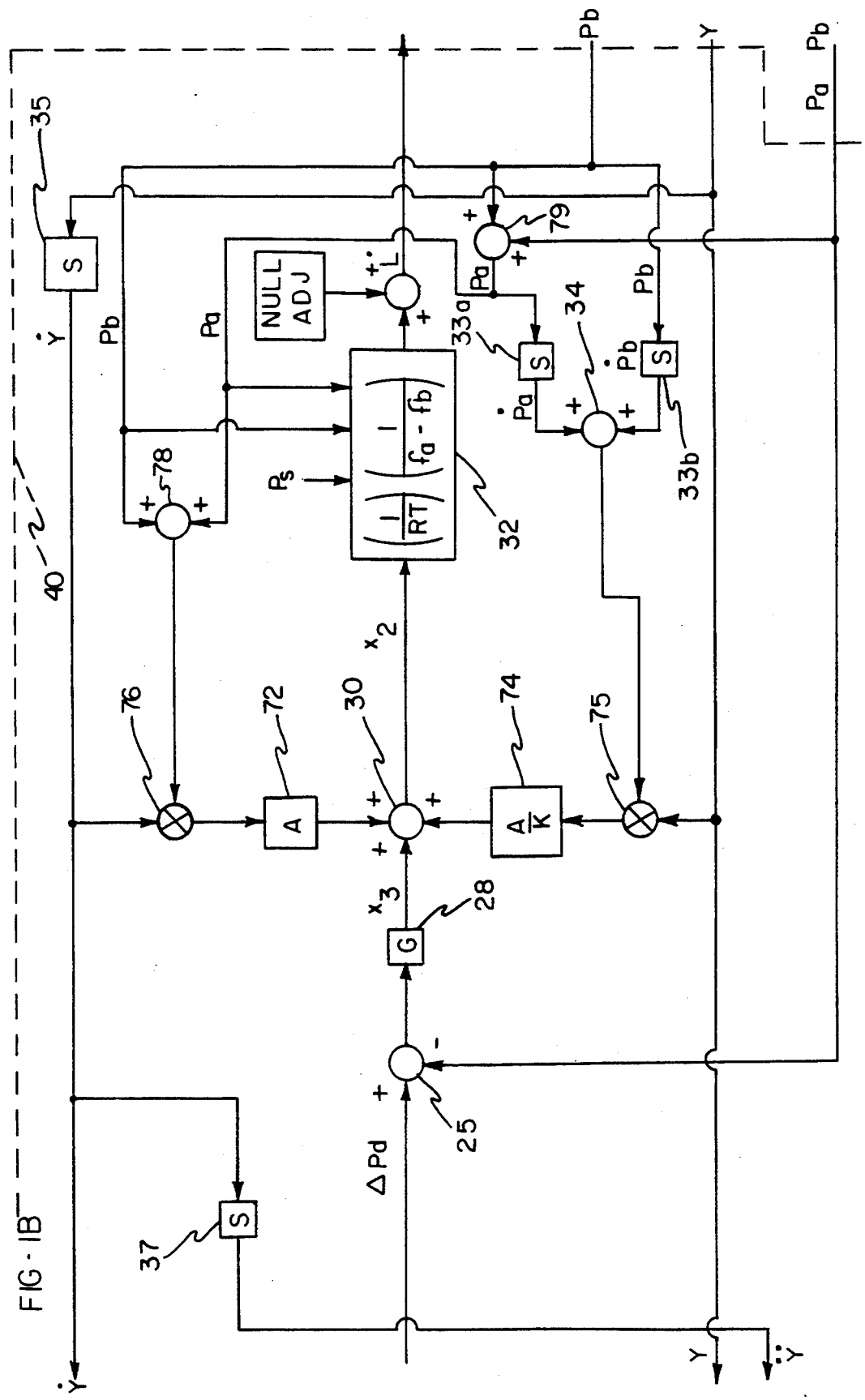
Figure 1C:
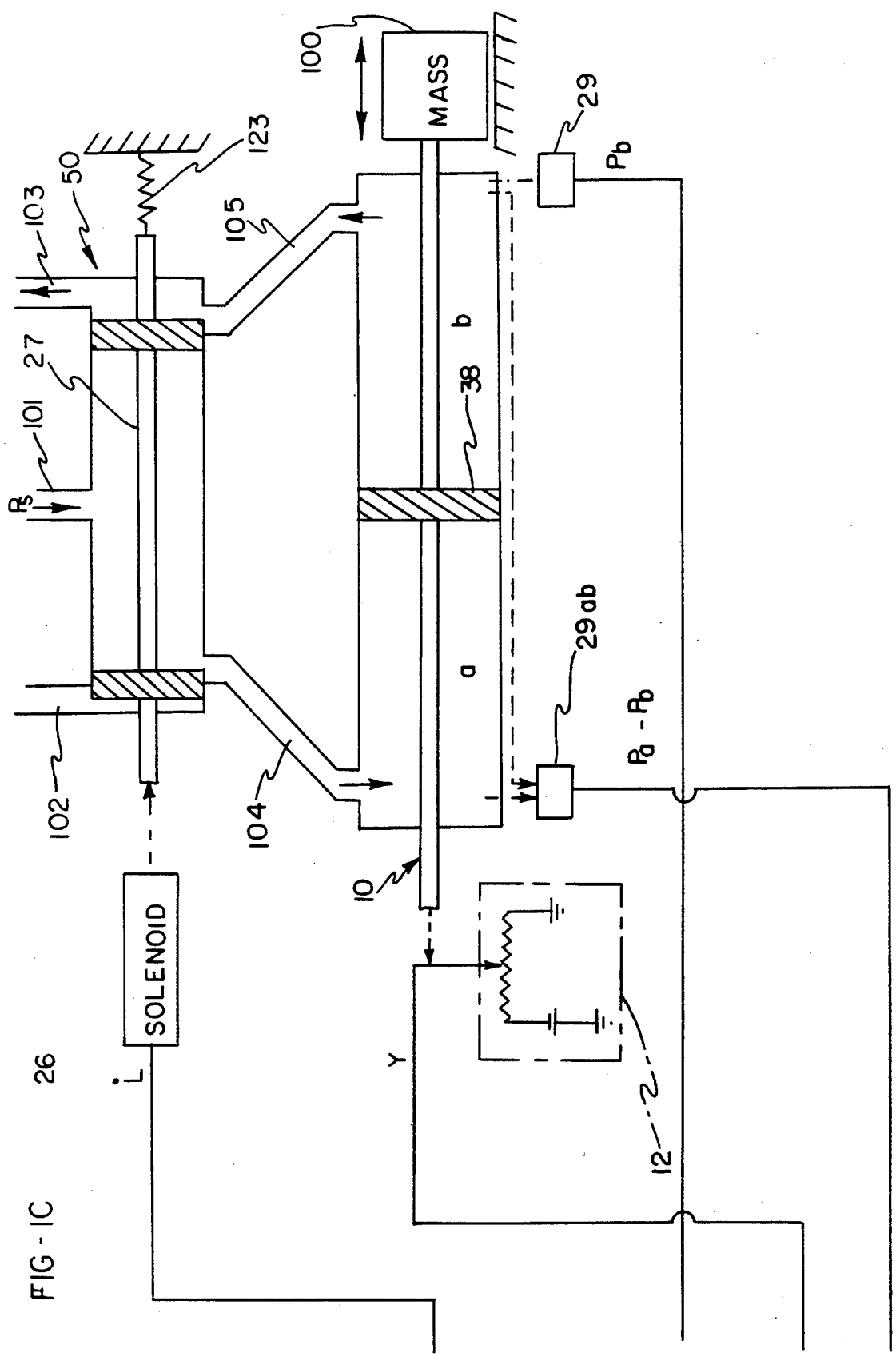

A preferred embodiment of the invention, as illustrated in FIG. 1, positions a pneumatic actuator 90 connected to a mass 100 by controlling the position of a spool 27 in a valve 50. Valve 50 has an input port 101 connected to a source of pressurized gas at a pressure P. and a pair of exhaust ports 102,103 which are open to the atmosphere. Valve 50 also has a port 104 connected to a first chamber a of actuator 90 and a second port 105 connected to a second chamber b of actuator 90. The chambers a,b are separated by a sliding double acting piston 38 connected to a rod 10 which moves in response to a pressure difference between chambers a and b. A differential pressure sensor 29ab senses the pressure difference between chamber a and chamber b, and a second pressure sensor 29b senses the pressure only in chamber b. Pressure sensors 29 ab and 29b may be readily available solid state bridge-type strain gauge sensors such as Model 1410 pressure sensors sold by I C Sensors of Milpiats, Calif. For accuracy of result they are incorporated directly into a transducer package including valve 50, as described in commonly-owned application, now U.S. Pat. No. 5,154,207 filed on even date herewith. The valve itself may be a commercially available 4-way proportional valve such as a model 10-1100 servo valve sold by Dynamic Valves, Inc. of Palo Alto, Calif.

Spool 27 is positioned by a solenoid 26 operating in response to a control current i to control the flow of pressurized gas between valve 50 and actuator 90. A position sensor 12 provides an output signal Y indicating the actual position of rod 10.

Control current i for solenoid 26 is supplied by a controller 40 which is preferably a programmed microprocessor, such as an 80C196KB microprocessor available from Intel Corporation of Santa Clara, Calif. One implementation of the invention using such a microprocessor connects solenoid 26 to a high-speed output port of the microprocessor. In that particular implementation, the microprocessor is programmed to generate the signal i in a pulse width modulated format. The PWM signal is converted into an amplitude modulated waveform for transmission to solenoid 26 operating against a spring 123 to position spool 27. The spool 27 responds to solenoid 26 by moving to a position such that the differential mass flow rate of the pressurized gas is proportional to i. The control signal i could also be generated as an amplitude modulated analog signal by a D/A converter attached to other digital computing means. Also controller 40 could be directly implemented by the equivalent analog circuitry which is illustrated in FIG. 1 for ease of understanding.

Controller 40 controls the operation of actuator 90 in closed loop fashion with the aid of three feedback signals; a position signal Y from sensor 12, a differential pressure $P_a-P_b$ from sensor 29ab and $P_b$ (the pressure in chamber b) from sensor 29b. In very general terms, controller 40 computes a desired trajectory through use of a trajectory computing routine indicated by the block 60 and achieves the desired trajectory through closed loop differential pressure control carried out inside a surrounding position control loop. Both of these loops are linearized by compensating the control signals for non-linear effects. The particular trajectory calculation steps employed in the block 60 are discussed in detail below.

Controller 40 compares the desired trajectory with achieved results and develops an acceleration command. The acceleration command is converted into a force command, and this command in turn is linearized through the addition of terms representing non-linear force effects. The linearized force command is converted into a desired differential pressure, which is compared with the feedback signal from pressure sensor 29ab for closed loop pressure control.

Referring now to the details of FIG. 1, the trajectory program 60 calculates desired values of position, velocity and acceleration. ($Y_d$, $\dot{Y}_d$ and $\ddot{Y}_d$ respectively) for the piston 10. Position sensor 12 feeds back the actual position Y which is differentiated once at 35 to obtain a calculated value for $\dot{Y}$ and a second time at 37 to obtain a calculated value for $\ddot{Y}$. Velocity and position errors are determined as illustrated schematically at summing junctions 14,16, and these errors then are multiplied by gain factors $K_v$ and $K_p$ to create compensation terms for addition to $\ddot{Y}_d$, as illustrated schematically at summing junction 18. $\ddot{Y}$ is multiplied by a feedback gain $K_a$ and subtracted from $\ddot{Y}_d$, as also indicated at 18. The resulting acceleration error is multiplied by an estimated mass (block 20) to obtain a force command $X_4$.

The microprocessor estimates the mass adaptively by a least squares, linear regression technique. It proceeds by making an initial estimate of the mass and adjusting it for each new move (i.e. working cycle) of the actuator. The mass value is limited so as to remain between minimum and maximum values specified by the user. For each move the microprocessor calculates 128 observed force values and 128 values of actual resulting acceleration. The new adjusted mass is calculated from the formula:

$$\text{Mass} = \frac{N \sum_{i=1}^{N} \ddot{Y}_i F_i - \left[\sum_{i=1}^{n} F_i\right] * \left[\sum_{i=1}^{N} \ddot{Y}_i\right]}{N \sum_{i=1}^{N} \ddot{Y}_i \ddot{Y}_i - \left[\sum_{i=1}^{N} \ddot{Y}_i\right] * \left[\sum_{i=1}^{N} \ddot{Y}_i\right]}$$

N = 128
F = observed force = A $(P_a - P_b) - \beta \dot{Y}$
A = piston area
$P_a$ = pressure in chamber a (Measured)
$P_b$ = pressure in chamber b (Measured)
$\ddot{Y}$ = observer acceleration Coulomb friction and viscous friction are estimated by moving the actuator at a series of predetermined constant velocity and collecting a series of force samples for each velocity. These force samples are collected by measuring the differential pressure in the actuator cylinder and multiplying it by the piston area. The force samples for each velocity are averaged to obtain one force sample per velocity. At any velocity $\dot{Y}$ the piston force $F_T$ has 3 components:

$$F_T = \beta \dot{Y} + F_C + F_L$$

Since the data is taken at constant velocity there is no acceleration force component.

The load component is removed from the above equation by averaging the piston force over constant velocities of equal magnitude and opposite direction. This then gives $$F_T = \beta \dot{Y} + F_C$$

which can be solved for $\beta$ and $F_c$ by the simultaneous solution of two such equations for two sets of data. However in many cases $\beta$ will vary with velocity. It has been found satisfactory for the embodiment described to assume a constant value of $\beta$ for a velocity range from 0 to 8 in/sec and another constant (somewhat lower) value of $\beta$ for higher velocities. This is conveniently done by performing a least square curve fitting routine for the two different velocity ranges.

The actuator responds nonlinearly to variations in the force command, due to the presence of viscous friction and coulomb friction and variations in the reacting load. Therefore the force command $X_4$ is transformed into a linearized form by the addition of compensating terms at summing junction 22. The resulting desired force is divided by the piston area A (at block 24) to obtain $\Delta P_d$, the desired differential pressure in the actuator cylinder. $\Delta P_d$ then is used for closed loop control of valve 50.

The pressure control loop multiplies $\Delta P_d$ by an adjustable gain G at block 28 to produce an interim variable $X_3$ which is fed to a summing junction 30. A first adjusting term is supplied to junction 30 from a block 72 and a second adjusting term is supplied to junction 30 from another block 74. Block 72 receives an input from a multiplying point 76 which in turn is connected to a summing junction 78 in such a way as to develop the product $\dot{Y}(P_a + P_b)$. Block 74 is connected to a multiplying point 75 which in turn is connected to summing junction 34 in such a way as to develop the product $Y(\dot{P}_a + \dot{P}_b)$. Blocks 72 and 74 multiply their inputs by A and A/k respectively, where:

A = piston area
k = ratio of specific heat

This causes junction 30 to have an output $X_2$ given by the equation:

$$X_2 = X_3 + A\dot{Y}(P_a + P_b) + \frac{AY}{k}(\dot{P}_a + \dot{P}_b)$$

In the above equation Y is the actual position measured by position sensor 12 and $P_b$ is the pressure in cylinder B as measured by pressure sensor 29b. The parameters $\dot{Y}$, $P_a$, $\dot{P}_a$ and $\dot{P}_b$ are computed by a series of operations as indicated by differentiators 35,33a,33b and summing junction 79. It can be shown that the variable $X_2$ has a value equal to the differential mass flow rate in actuator cylinder a and b.

The multiplying points 75,76 are particularly important to the practice of this invention in that they produce signals for use in compensating the control signal for the non-linear terms $$A\dot{Y}(P_a + P_b) \text{ and } \frac{AY}{k} (\dot{P}_a + \dot{P}_b).$$

This can be understood from the following discussion.

Consider the differential mass flow rate through valve 50 and into the cylinder of actuator 90. This differential mass flow rate is produced by current i and solenoid 26 in accordance with the equation $$M_a - M_b = i(f_a - f_b)$$

where $f_a$ and $f_b$ are flow functions given by the following relationships:

For $i > 0$,
For $P_a/P_s < 0.528$, $$f_a = \frac{C_d A_{max}}{i_{max}} P_s \sqrt{\frac{2kg}{RT(k-1)} \left(\frac{P_a}{P_s}\right)^{\frac{2}{k}} \left[1 - \left(\frac{P_a}{P_s}\right)^{\frac{k-1}{k}}\right]}$$

For $P_a/P_s \geq 0.528$, $$f_a = \frac{C_d A_{max}}{i_{max}} P_s \sqrt{\frac{2kg}{RT(k-1)} \left(\frac{2}{k+1}\right)^{\frac{2}{k-1}} \left[1 - \frac{2}{k+1}\right]}$$

For $14.7/P_b < 0.528$, $$f_b = - \frac{C_d A_{max}}{i_{max}} P_b \sqrt{\frac{2kg}{RT(k-1)} \left(\frac{14.7}{P_b}\right)^{\frac{2}{k}} \left[1 - \left(\frac{14.7}{P_b}\right)^{\frac{k-1}{k}}\right]}$$

For $14.7/P_b \geq 0.528$, $$f_b = - \frac{C_d A_{max}}{i_{max}} P_b \sqrt{\frac{2kg_c}{RT(k-1)} \left(\frac{2}{k+1}\right)^{\frac{2}{k-1}} \left[1 - \frac{2}{k+1}\right]}$$

For $i < 0$,
For $14.7/P_a < 0.528$ $$f_a = - \frac{C_d A_{max}}{i_{max}} P_a \sqrt{\frac{2kg_c}{RT(k-1)} \left(\frac{14.7}{P_a}\right)^{\frac{2}{k}} \left[1 - \left(\frac{14.7}{P_a}\right)^{\frac{k-1}{k}}\right]}$$

For $14.7/P_a \geq 0.528$ $$f_a = - \frac{C_d A_{max}}{i_{max}} P_a \sqrt{\frac{2kg_c}{RT(k-1)} \left(\frac{2}{k+1}\right)^{\frac{2}{k-1}} \left[1 - \frac{2}{k+1}\right]}$$

For $P_b/P_s < 0.528$, $$f_b = \frac{C_d A_{max}}{i_{max}} P_s \sqrt{\frac{2kg_c}{RT(k-1)} \left(\frac{P_b}{P_s}\right)^{\frac{2}{k}} \left[1 - \left(\frac{P_b}{P_s}\right)^{\frac{k-1}{k}}\right]}$$

For $P_b/P_s \geq 0.528$ $$f_b = \frac{C_d A_{max}}{i_{max}} P_s \sqrt{\frac{2kg_c}{RT(k-1)} \left(\frac{2}{k+1}\right)^{\frac{2}{k-1}} \left[1 - \frac{2}{k+1}\right]}$$

where
$A_{max}$ = max flow passing area of valve
$i_{max}$ = max solenoid current supply
$P_s$ = supply pressure
$k$ = ratio of specific heats
$R$ = gas constant
$T$ = temperature
$C_d$ = discharge coefficient
$g_c$ = gravitational constant The differential mass flow rate produces pneumatic conditions within the actuator cylinders in accordance with the following non-linear differential equation:

$$\dot{m}_a - \dot{m}_b = \frac{V_o}{kRT} \Delta \dot{P} + \frac{1}{RT} \left[ A\dot{Y}(P_a + P_b) + \frac{AY}{k} (\dot{P}_a + \dot{P}_b) \right]$$

The relation between the current i and the pneumatic condition then is:

$$i = \frac{1}{f_a - f_b} \frac{1}{RT} \left[ \frac{V_o}{k} \Delta \dot{P} + A\dot{Y}(P_a + P_b) + \frac{AY}{k} (\dot{P}_a + \dot{P}_b) \right]$$

Returning now to the description of FIG. 1, the controller 40 sets the solenoid current by taking the output $X_2$ from junction 30 and performing the following valve inverse operation at block 32:

$$i = \left(\frac{1}{RT}\right)\left(\frac{1}{f_a - f_b}\right) X_2$$

which effectively commands a solenoid current in accordance with the equation:

$$i = \frac{X_3 + A\dot{Y}(P_a + P_b) + \frac{AY}{k}(\dot{P}_a + \dot{P}_b)}{RT(f_a - f_b)}$$

Setting this current command expression equal to the above pneumatic condition expression, we have:

$$\frac{1}{RT(f_a - f_b)}\left[X_3 + A\dot{Y}(P_a + P_b) + \frac{AY}{k}(\dot{P}_a + \dot{P}_b)\right] =$$

$$\frac{1}{RT(f_a - f_b)}\left[\frac{V_o}{k}\Delta\dot{P} + A\dot{Y}(P_a + P_b) + \frac{AY}{k}(\dot{P}_a + \dot{P}_b)\right]$$

From which it may be seen:

$$X_3 = \frac{V_o}{k}\Delta\dot{P}$$

which is a linear relationship defining an open loop transfer function of the form:

$$\Delta P = \frac{X_3 k}{V_o}\frac{1}{s}$$

where s is the Laplace operator.

Figure 2:
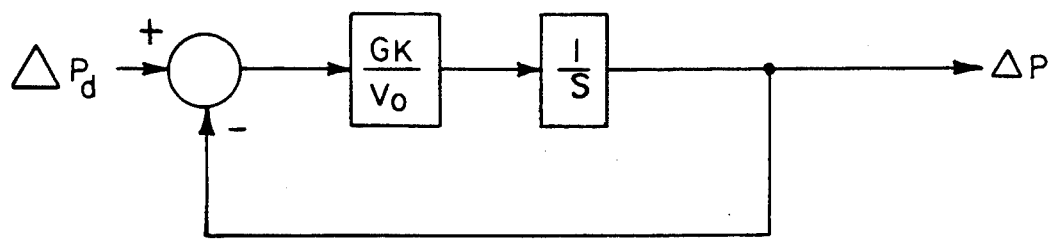
FIG. 2 is a schematic illustration of the linearized equivalent of the pressure control portion of the systems of FIGS. 1A–1C.

Therefore when the pressure control loop is closed by subtracting P from $P_d$ at junction 25, the system has effectively implemented a closed loop pneumatic pressure controller as illustrated in FIG. 2. The closed loop transfer function is:

$$\Delta P = \frac{GK}{GK + V_o s}\Delta P_d$$

Classical linear control techniques may be used for setting the gain G so as to product the desired response. Accordingly, the invention achieves accurate linear closed loop pressure control of a non-linear pneumatic process, without employing any linearizing approximations.

As discussed above, control linearization is accomplished by adding the terms $$A\dot{Y}(P_a + P_b) \text{ and } \frac{AY}{k}(\dot{P}_a + \dot{P}_b)$$

to the control signal. Each of these terms is the product of a position variable and a pressure variable, and the sum of the terms may be generalized to be equal to $$\frac{d}{dt}[YA(P_a + P_b)]$$

which is the time derivative of the product of a position variable and a pressure variable. The formation of these products is accomplished through a digital multiplication routine which is illustrated schematically in FIG. 1 at multiplying points 75,76. Depending upon the particular control scheme employed, the linearization term or terms may combine a position variable and a pressure variable in a somewhat different manner than described above. Also, the linearization term may be added at other locations in the pressure control loop, so long as it has the net effect of producing an actuator pressure which responds linearly to changes in the desired pressure. The location should be upstream from the valve inversion routine. Lacking the added, linearizing term the system open loop behavior is described by the following non-linear differential equation:

$$\dot{m}_a - \dot{m}_b = \frac{V_o}{RTk}\frac{d}{dt}(P_a - P_b) +$$

$$\frac{A}{TC_p}(P_a + P_b)\frac{dy}{dt} + \frac{A}{kRT}\frac{d}{dt}(YP_a + YP_b)$$

$V_o$=initial chamber volume which cannot be solved in closed form.

Figure 3:
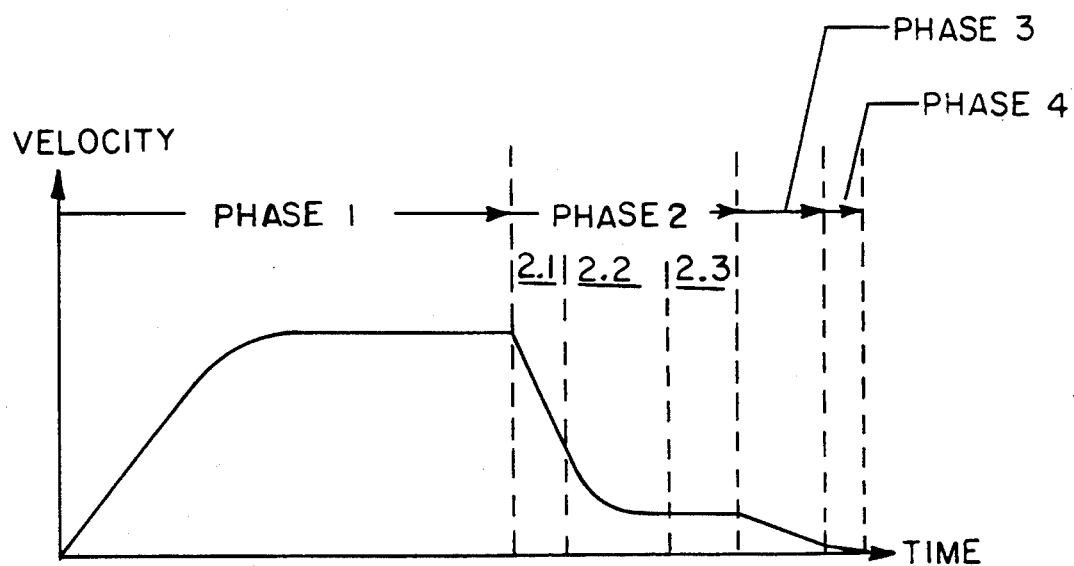
FIG. 3 is a schematic illustration of a trajectory path for a pneumatic actuator.

A preferred trajectory for use in connection with the practice of this invention may take a form as shown in FIG. 3. Shown therein is a plot of velocity vs. time as the piston moves from an initial to a final position. Prior art pneumatic controllers generally have 3 trajectory phases; a first phase of constant acceleration, a second phase of constant velocity, and a third phase of constant deceleration. This type of trajectory produces a jerky behavior in low pressure gas systems. It has been found in accordance with the present invention that a smooth result may be obtained if one employs a trajectory having phases which avoid constant acceleration at the beginning and constant deceleration at the end.

The preferred trajectory has 4 phases, during the first of which the system functions as a velocity controller. During this phase the trajectory routine sets $\ddot{Y}_d$=O and $\dot{Y}_d$=Y. This produces a smooth velocity buildup which asymptotically approaches a target velocity which may be selected by the system designer in accordance with the intended application.

Phase 2 is a deceleration phase, and may encompass a plurality of sub-phases such as sub-phase 2.1, 2.2 and 2.3. During this phase of the trajectory the sub-phases are each individually predefined, based upon system performance and are independent of Y, $\dot{Y}$, or $\ddot{Y}$ actually achieved during the sub-phase. However, the gains $K_p$, $K_v$ and $K_a$ may be adjusted to start a new sub-phase when the actual velocity $\dot{Y}$ has decreased to come predetermined values. By way of example, phase 2.2 may begin when $\dot{Y}$ has slowed down to 5 in./sec. Phase 2.3 may begin when $\dot{Y}$ is less than 2 in./sec. for 0.120 sec.

Phase 3 and 4 begin when the piston gets within some predefined distance from the target position, such as, for instance 0.3 in. and 0.050 in. respectively. During Phase 3 $\ddot{Y}_d$=O. During Phase 4 $\ddot{Y}_d$=0, $\dot{Y}_d$=0 and $Y_d$=target position, so that the system becomes a pure position controller directed at the target. Within Phase 4 the feedback gains are altered as a function of the target distance. Such gain alteration aids in the positioning accuracy.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In a pneumatic positioning system comprising valve means for supplying a pressurized gas at a controlled rate and an actuator connected for receiving said pressurized gas and responsive thereto for positioning a workpiece, an automatic controller comprising:
  position sensing means for generating a position signal corresponding to the position of said actuator,
  trajectory means responsive to said position signal for generating a force command for said actuator, means for converting said force command into a gas pressure command, means for converting said gas pressure command into a gas mass flow rate command, valve control means for causing said valve to supply said gas to said actuator at a mass flow rate corresponding to said mass flow rate command, pressure sensing means for sensing the pressure of the gas being supplied to said actuator and generating a pressure signal corresponding thereto, and feedback means for comparing said pressure signal with said pressure command and causing adjustment of said gas mass flow rate command in correspondence with a difference therebetween.

2. Apparatus according to claim 1 and further comprising means for adjusting said force command to compensate for friction effects and external loading.

3. Apparatus according to claim 2 wherein said means for converting said gas pressure command into a gas mass flow rate command comprises means responsive to said position signal and said pressure signal for determining values of position, velocity, pressure and pressure rate and means for using said values to calculate a gas mass flow rate.

4. Apparatus according to claim 2 wherein said trajectory means comprises means for generating an acceleration command, mass estimation means for estimating the mass being moved by the actuator and means responsive to said acceleration command and said estimated mass for generating said force command.

5. Apparatus according to claim 4 wherein said trajectory means comprises means for adjusting said acceleration command in accordance with desired corrections in position and velocity.

6. In a position control system for a pneumatic actuator comprising a valve housing provided with an inlet port for connection to a source of pressurized gas and an outlet port in communication with said inlet port for producing a controlled supply of said gas to an actuator connected thereto, a position sensor for generating a position signal indicating the actual position of said actuator, a reference signal generator for generating a reference signal indicating a desired position for said actuator, a controller connected for receiving said reference signal and said position signal and comprising computing means for generating a valve adjustment current related to a difference between said reference signal and said position signal, and valve adjustment means responsive to said valve adjustment current for adjusting the flow of said gas through said valve housing from said inlet port to said outlet port; the improvement wherein said position control system further comprises pressure sensing means connected to said outlet port for generating and transmitting to said computing means a pressure signal which indicates the actual pressure of the gas being supplied by said outlet port to said actuator; said computing means being programmed for:

(1) comparing said position signal against said reference signal to determine a position error, (2) computing a desired gas pressure for actuating said actuator to correct said position error, (3) computing a pressure error related to the difference between said desired gas pressure and the actual pressure indicated by said pressure signal, (4) using said pressure error to generate said valve adjustment signal, and (5) adjusting said desired gas pressure to compensate for non-linearities in the pneumatic process within said actuator.

7. A position control system for a pneumatic actuator comprising:

a valve housing provided with an inlet port for connection to a source of pressurized gas and first and second outlet ports in communication with said inlet port for providing controlled supplies of said gas to opposite sides of piston connected thereto, a position sensor for generating a position signal indicating the actual position of said piston, a reference signal generator for generating a reference signal indicating a desired position for said piston, pressure sensing means for generating a differential pressure signal which indicates the differential pressure between the gas being supplied to said actuator by said first and second outlet ports.

a controller connected for receiving said position signal, said reference signal and said pressure differential signal and comprising computing means programmed for:

(1) comparing said position signal against said reference signal to determine a position error, (2) computing a desired differential gas pressure for actuating said actuator to correct said position error, (3) adjusting said desired differential gas pressure to compensate for non-linearities in the pneumatic process within said actuator, (4) computing a pressure error related to the difference between said desired differential gas pressure and the actual differential indicated by said pressure signal, and (5) using said pressure error to generate a valve adjustment signal, and Valve adjustment means responsible to said valve adjustment signal for adjusting the flow of said gas through said valve housing from said inlet port to said first and second outlet ports, and thereby moving said piston to said desired position.

8. Apparatus for positioning a workpiece comprising:

a pneumatic actuator having a cylinder for receiving a flow of pressurized gas and a piston moveable within said cylinder in response to the pressure of said gas for positioning said workpiece, valve means having an input port for receiving a supply of said gas at a controlled pressure, an output port for providing a flow of said gas to said cylinder, and flow control means responsive to a control current for controlling the flow rate of said gas through said valve and into said cylinder, a position sensor for generating a position signal indicating the actual position of said piston, comparator means for comparing said actual position with a desired position of said piston and operative in response to said comparison for generating a valve control command representing a desired pressure for the gas within said cylinder, linearizing means including means for generating an adjustment term containing the product of a position factor and a pressure factor, and means for combining said adjustment term with said valve control command to obtain an adjusted command which is compensated for non-linearities in the pneumatic process within said cylinder, valve inversion means for computing and generating the amount of control current which will produce the gas flow indicated by said adjusted command, a pressure sensor for generating a pressure signal indicating the actual pressure of the gas within said cylinder, and pressure control means for receiving said pressure signal and causing said control current to vary in accordance with differences between said actual pressure and said desired pressure.

9. Apparatus according to claim 8 wherein said cylinder has two chambers a and b and said piston is double acting within said cylinder between said chambers; said valve means has ports for supplying pressurized gas to both of said chambers; said pressure sensor comprises means for indicating the pressure $P_a$ in the chamber a and the pressure $P_b$ in chamber b; and said linearizing means comprises means for generating said adjustment term in the form:

$$A\dot{Y}(P_a + P_b) + \frac{AY}{k}(\dot{P}_a + \dot{P}_b)$$

where A = piston area and Y = piston position.

10. A method of moving a pneumatic actuator from a starting position to a target position comprising the repeated performance of the following sequence of steps:
1) measuring the actual position of said actuator,
2) comparing said actual position with said target position and using the result of said comparison to generate a pressure command,
3) converting said pressure command to a mass flow rate command,
4) supplying pressurized gas to said actuator at a mass flow rate corresponding to said mass flow rate command,
5) measuring the pressure of the gas supplied to said actuator, and
6) adjusting said pressure command in accordance with the pressure so measured.

11. A method of controlling the position of a pneumatic actuator of the type comprising a gas receiving cylinder and a double acting piston having opposed active surfaces of area A and mounted in said cylinder for movement to different positions Y in response to different gas pressures in opposed chambers a and b of said cylinder; said method comprising the steps of:

supplying flows of a pressurized gas to said chambers;

sensing pneumatic conditions within said chambers for establishing a pressure difference $P_a - P_b$, a pressure sum $P_a + P_b$ and a pressure rate $\dot{P}_a + \dot{P}_b$, where $P_a$ and $P_b$ are the pressures in chambers a and b respectively; determining the values of Y and $\dot{Y}$ which correspond to the pressure sum $\dot{P}_a + \dot{P}_b$ and the pressure rate $P_a + P_b$;

comparing the pressure difference $P_a - P_b$ with a desired pressure difference $\Delta P_d$ to establish a pressure command;

adjusting said pressure command by adding thereto the expression $$A\dot{Y}(P_a + P_b) + \frac{AY}{k}(\dot{P}_a + \dot{P}_b),$$

and using the adjusted value of said pressure command to control the flows of said gas to said chambers.

12. A method of controlling the position of a pneumatic actuator comprising the steps of supplying a controlled flow of a pressurized gas to said actuator and thereby causing movement of a piston within said actuator, measuring the position Y of said piston, calculating the velocity $\dot{Y}$ and the acceleration $\ddot{Y}$ of said piston, calculating a desired position $Y_d$, desired velocity $\dot{Y}_d$ and desired acceleration $\ddot{Y}_d$ for said piston, multiplying Y, $\dot{Y}$ and $\ddot{Y}$ by feedback gains $K_p$, $K_v$ and $K_a$ respectively, calculating a command by performing the operation $$K_p(Y_d - Y) + K_v(\dot{Y}_d - \dot{Y}) - K_a\ddot{Y}$$

creating a plurality of trajectory phases including a first phase where $\ddot{Y}_d = 0$ and $\dot{Y}_d = Y$ where $\dot{Y}_d$ is non zero and independent of Y, a second phase where $\ddot{Y}_d$, $\dot{Y}_d$ and $Y_d$ are all non zero and independent of $\ddot{Y}$, $\dot{Y}$ and Y, a third phase where $\ddot{Y}_d = 0$ while $\dot{Y}_d$ and $Y_d$ are non zero and independent of $\dot{Y}$ and Y and a fourth phase where $\ddot{Y}_d = 0$ and $\dot{Y}_d = 0$ while $Y_d$ is non zero and independent of Y, converting said command to a desired gas pressure for said actuator, measuring the pressure of the gas acting against said piston, comparing said desired gas pressure against said measured gas pressure to determine an error, and using said error to control the supply of gas to said actuator.

* * * * *